US009013965B2

United States Patent
Ahn et al.

(10) Patent No.: US 9,013,965 B2
(45) Date of Patent: Apr. 21, 2015

(54) OPTICAL PICKUP DEVICE AND OPTICAL DISK DRIVE INCLUDING THE SAME

(71) Applicant: Toshiba Samsung Storage Technology Korea Corporation, Suwon-si (KR)

(72) Inventors: Ji-sun Ahn, Seoul (KR); Ui-yol Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/930,091

(22) Filed: Jun. 28, 2013

(65) Prior Publication Data

US 2014/0010064 A1 Jan. 9, 2014

(30) Foreign Application Priority Data

Jul. 3, 2012 (KR) .................. 10-2012-0072408

(51) Int. Cl.
*G11B 7/1365* (2012.01)
(52) U.S. Cl.
CPC .................... *G11B 7/1365* (2013.01)
(58) Field of Classification Search
None
See application file for complete search history.

(56) References Cited

U.S. PATENT DOCUMENTS

| 5,748,602 | A  | * | 5/1998  | Chao et al. ............... 369/112.17 |
| 6,483,797 | B1 | * | 11/2002 | Oakley et al. ............ 369/112.01 |
| 2006/0039265 | A1 |   | 2/2006  | Lee |
| 2010/0246369 | A1 | * | 9/2010  | Sato ....................... 369/112.23 |
| 2013/0343171 | A1 | * | 12/2013 | Nakamura ................. 369/103 |

FOREIGN PATENT DOCUMENTS

| JP | 10-188317  | 7/1998  |
| JP | 2002-230820 | 8/2002 |
| JP | 2007-026597 | 2/2007 |
| JP | 2007-317315 | 12/2007 |

OTHER PUBLICATIONS

Korean Office Action issued Aug. 20, 2013 in counterpart Korean Patent Application No. KR10-2012-0072408 (4 pages, in Korean).

* cited by examiner

*Primary Examiner* — Wayne Young
*Assistant Examiner* — Dionne Pendleton
(74) *Attorney, Agent, or Firm* — NSIP Law

(57) ABSTRACT

Provided are an optical pickup device and an optical disk drive including the same. The optical pickup device includes a quarter-wave plate (QWP) that is disposed parallel to an objective lens and a reflection mirror that reflects a beam back onto the QWP after the beam passed through the QWP. The optical pickup device also includes a polarization mirror that is disposed between the objective lens and the QWP, and which reflects the beam which is generated from a light source onto the QWP, and allows the beam reflected by the reflection mirror to pass through to the objective lens.

18 Claims, 4 Drawing Sheets

OPTICAL PICKUP DEVICE AND OPTICAL DISK DRIVE INCLUDING THE SAME

CROSS-REFERENCE TO RELATED APPLICATION(S)

This application claims the benefit under 35 USC §119(a) of Korean Patent Application No. 10-2012-0072408, filed on Jul. 3, 2012, in the Korean Intellectual Property Office, the entire disclosure of which is incorporated herein by reference for all purposes.

BACKGROUND

1. Field

The following description relates to an optical pickup device, and more particularly, to an ultra-thin optical pickup device and an optical disk drive including the same.

2. Description of Related Art

An optical disk drive includes a mechanical system for driving an optical disk and an optical system for reproducing and recording information from/to the optical disk. Typically the optical system travels in a radial direction along an inner surface of the optical disk based on an operation of the mechanical system. The optical pickup device typically includes several optical parts such as an objective lens, a light source, a reflection mirror, and a beam splitter.

Unlike a half-height (H/H) type optical disk drive, a slim-type optical disk drive is used for small-sized mobile devices, for example, a mobile optical disk drive (ODD), a laptop computer, a notebook computer, and the like. As devices increasingly become slimmer in size, it is necessary to further downsize an ODD so as to fit within the slimmer devices.

SUMMARY

In an aspect, there is provided an optical pickup device including a light source for generating a beam for recording and/or reproducing information to/from a medium, an objective lens that is arranged to correspond to the medium, a quarter-wave plate (QWP) that is disposed parallel to the objective lens, a reflection mirror that reflects a beam onto the OWP after the beam passes through the QWP, and a polarization mirror that is disposed between the objective lens and the QWP, and which reflects a beam that is generated from the light source onto the QWP, and allows the beam reflected by the reflection mirror to pass through to the objective lens.

The beam may be incident on the polarization mirror along a path in a direction that is substantially perpendicular to a beam axis of the objective lens.

The objective lens may comprise a spherical surface that protrudes in a direction of the polarization mirror.

The objective lens may comprise a spherical surface that is positioned at a height that intersects a width of the beam generated by the light source.

The reflection mirror and the QWP may be formed as one body.

The objective lens, the polarization mirror, the QWP, and the reflection mirror may each be arranged along the same optical axis such that light is either reflected by or allowed to pass through each element along the same axis.

The beam which is incident from the light source may comprise a first polarization element, and the beam which passes through the QWP and is incident on the polarization mirror may comprise a second polarization element.

The polarization mirror may comprise a plate-type mirror or a prism mirror.

In an aspect, there is provided an optical disk drive including a light-source system that comprises a light source for generating a beam for recording and/or reproducing information to/from a medium, an objective lens that is arranged to correspond to the medium, a quarter-wave plate (QWP) that is disposed parallel to the objective lens, a reflection mirror that reflects a beam onto the QWP after the beam passes through the QWP, a polarization mirror that is disposed between the objective lens and the QWP, and which reflects a beam that is generated from a light source onto the QWP, and allows the beam reflected by the reflection mirror to pass through to the objective lens, an optoelectronic system that comprises an optoelectronic device for converting the beam reflected by the disk into an electrical signal, a mechanic system for allowing a focusing operation and a tracking operation of the objective lens to be performed, and a circuit unit which is connected to the light source, the optoelectronic system, and the mechanic system.

The beam may be incident on the polarization mirror along a path in a direction that is substantially perpendicular to a beam axis of the objective lens.

The objective lens may comprise a spherical surface that protrudes in a direction of the polarization mirror.

The objective lens may comprise a spherical surface that is positioned at a height that intersects a width of the beam generated by the light source.

The reflection mirror and the QWP may be formed as one body.

The objective lens, the polarization mirror, the QWP, and the reflection mirror may each be arranged along the same optical axis such that light is either reflected by or allowed to pass through each element along the same axis.

The beam which is incident from the light source may comprise a first polarization element, and the light which passes through the QWP and is incident on the polarization mirror may comprise a second polarization element.

The polarization mirror may comprise a plate-type mirror or a prism mirror.

Other features and aspects may be apparent from the following detailed description, the drawings, and the claims.

Figure 1:
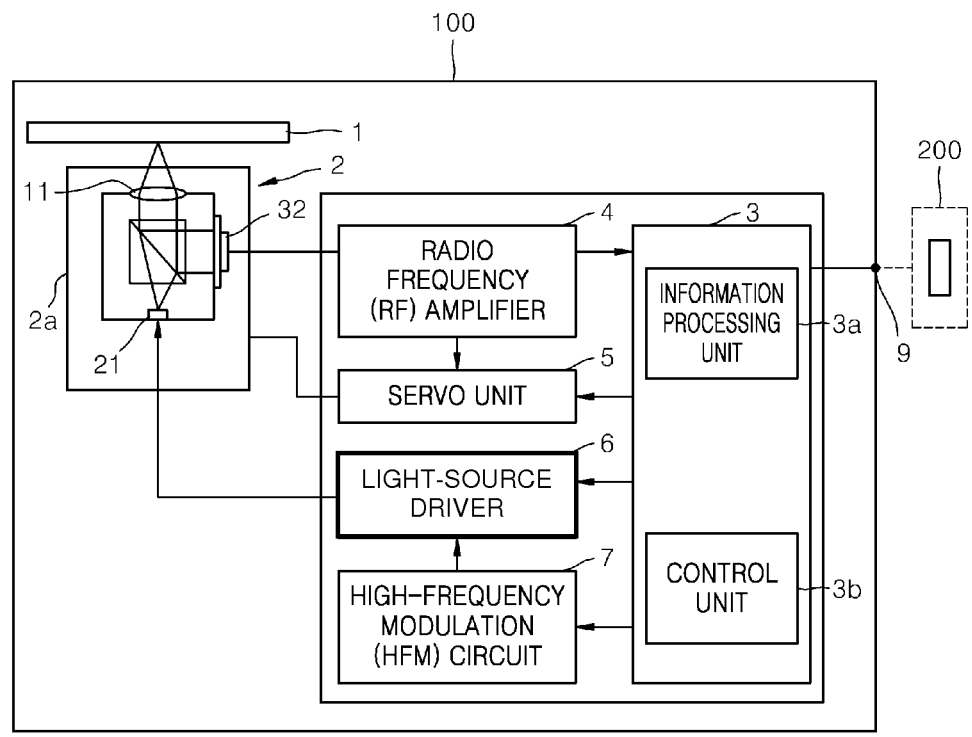
FIG. 1 is a diagram illustrating an example of an optical disk drive which includes an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical disk drive 100.

Referring to FIG. 1, the optical disk drive 100 includes an optical pickup device 2 for reproducing and recording information from/to a medium 1 and a circuit unit 200 connected to the optical pickup device 2. The optical pickup device 2 also includes an optical system and a mechanical system 2a that mechanically supports the optical system and allows a focusing operation and a tracking operation of the objective lens 11 to be performed. In this example, the optical system includes a light source 21 and an objective lens 11.

Furthermore, an optoelectronic device 32, a light source 21, and a mechanical system 2a of the optical pickup device 2 are connected to the circuit unit 200. For example, the optoelectronic device 32 included in the optical system is an element of the circuit unit 200, and is electrically connected to a front-end part 4 that includes a radio-frequency (RF) amplifier. The light source 21 may be connected to a light-source driver or a laser diode driver (LDD) 6. The RF amplifier amplifies a signal, and the front-end part 4 preprocesses the amplified signal, and thus, generates raw data. In this example, the light-source driver 6 is connected to a high-frequency modulation (HFM) circuit 7 that provides a HFM component.

The mechanical system 2a included in the optical pickup device 2 is connected to a servo unit 5. The servo unit 5 is used to control the tracking and focusing of the optical pickup device 2. The front-end part 4, the servo unit 5, the light source driver 6, and the HFM circuit 7 are connected to a digital signal processing (DSP) controller 3. The DSP controller 3 includes an information processing unit 3a that includes a decoder/encoder for processing a signal from the front-end part 4, and a system control unit 3b that controls all elements inside the system such as the servo unit 5, the light-source driver 6, and the HFM circuit 7.

Figure 2:
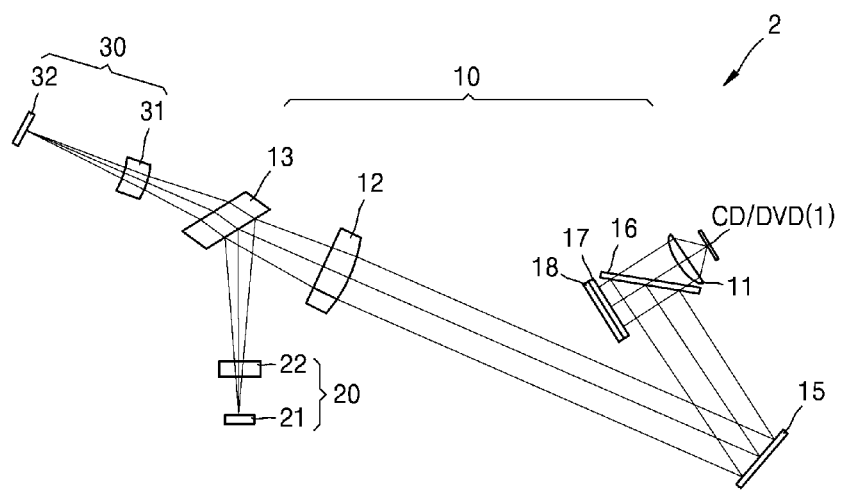
FIG. 2 is a diagram illustrating an example of an optical configuration map of the optical pickup device.

FIG. 2 illustrates an example of an optical configuration map of the optical pickup device 2.

As illustrated in FIG. 2, an optical transmission system 10 corresponds to the medium 1 such as CD, DVD, Blu-ray, and the like. A light-source system 20 provides a plurality of beams for reproducing and/or recording information from/to the medium 1. For example, the light-source system 20 may provide 3 beams including a central main beam and first and second lateral sub-beams. An optoelectronic system 30 generates an electrical signal for processing a data signal or a tracking error signal (TES) by using the optoelectronic device 32 that may include three optoelectronic cells for receiving the three beams reflected from the medium 1 for reproducing information therefrom.

In this example, the light-source system 20 includes a light source 21 and a diffraction device 22. A beam generated from the light source 21 is incident on a beam splitter 13 via the diffraction device 22. The diffraction device 22 may form three beams including a main beam and ±1st sub-beams, by applying a diffraction effect on a single beam which is generated from the light source 21.

The optoelectronic system 30 includes the optoelectronic device 32 that detects the three beams, which are reflected from the medium 1 and which pass through the beam splitter 13. The optoelectronic system 30 generates an electrical signal, and further includes a sensing lens 31 that converges the central main beam and the first and second lateral sub-beams into a size appropriate for the optoelectronic device 32.

The optical transmission system 10 includes the objective lens 11 that is arranged to correspond to the medium 1, a first reflection mirror 15 for changing a beam path, a polarization mirror 16, a quarter-wave plate (QWP) 17, and a second reflection mirror 18. The beam splitter 13 may reflect three beams that are transmitted from the light-source system 20 and that are in a first polarized beam status to the objective lens 11, and may transmit a second polarized beam, which is reflected from the medium 1 and returns to the beam splitter 13, to the optoelectronic system 30.

The polarization mirror 16 reflects the first polarized beam and allows the second polarized beam that has a different polarization element from the first polarized beam to pass through. In this example, the polarization mirror 16 is inclined with respect to a beam axis which passes through the objective lens 11 and a beam axis of the first reflection mirror 15. The QWP 17 and the second reflection mirror 18 are located on opposing sides of the polarization mirror 16 with respect to the objective lens 11. In this example, the QWP 17 and the second reflection mirror 18 are located at an opposite location of a proceeding direction of the first polarized beam which is reflected from the polarization mirror 16. Accordingly, the polarization mirror 16, the QWP 17, and the second reflection mirror 18 are located on a beam axis that passes through the objective lens 11. In some examples, the QWP 17 and the second reflection mirror 18 may be attached to each other and formed as one body.

Figure 3:
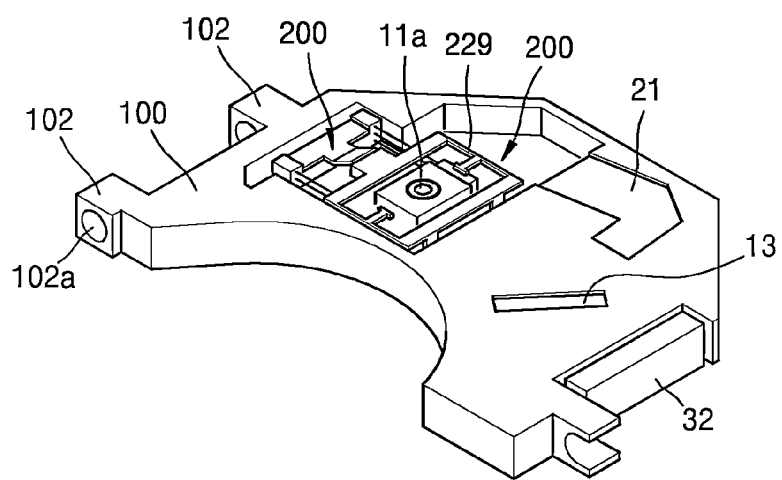
FIG. 3 is a diagram illustrating an example of the optical pickup device.

FIG. 3 illustrates an example of a slim-type optical pickup device in which the optical structure as described above is assembled in one base 100.

Referring to FIG. 3, the base 100 has a thickness and a space that may accommodate multiple optical parts, as illustrated in FIG. 2. The base 100 may be formed of aluminum die casting or plastic mold. The base 100 includes an objective-lens driving unit 200 in which a protective cover 229 for covering the objective lens 11 and a surrounding of the objective lens 11 is provided. Additional optical parts such as the beam splitter 13, the light source 21, and the optoelectronic device 32 may be built into the base 100. The optical parts may be disposed as illustrated in FIG. 2. A shaft guide portion 102, which includes a through hole 102a into which a guide shaft (not illustrated) in the optical disk drive device is inserted, is formed at one side of the base 100.

Recently there has been an interest in reducing the size of a slim-type optical pickup device in an effort to further reduce the size of mobile devices. A height of the optical pickup device 2 is limited by the objective lens 11 and an optical part which is adjacent to the objective lens 11. According to various aspects, a thickness of the base 100 may be reduced in comparison to a conventional optical pickup device. For example, the thickness of the base 100 may be reduced due to characteristics of the focusing optical system nearby the objective lens 11.

Figure 4:
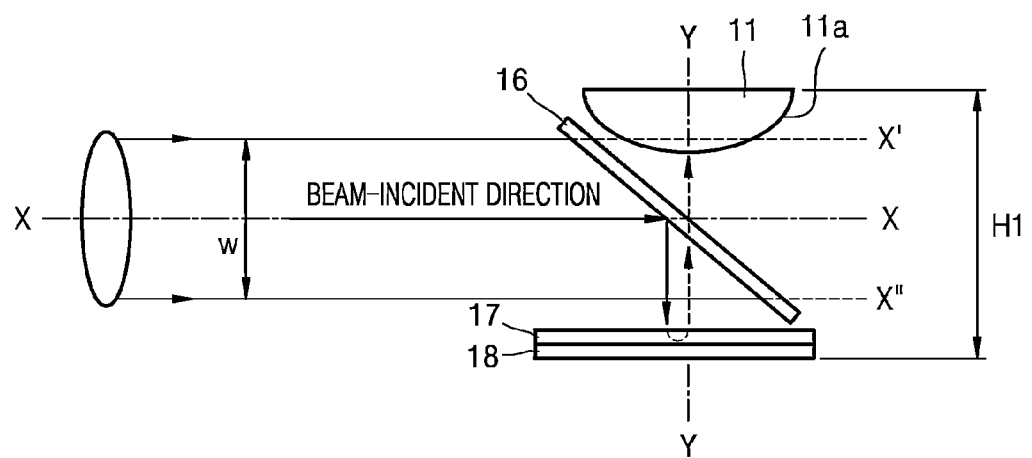
FIG. 4 is a diagram illustrating an example of a focusing optical system included in the optical pickup device.

As shown in FIG. 2, the focusing optical system includes the polarization mirror 16, the QWP 17, and the second reflection mirror 18. FIG. 4 illustrates another example of a focusing optical system included in the optical pickup device. Here, the objective lens 11, the polarization mirror 16, the QWP 17, and the second reflection mirror 18 are each arranged on the same optical axis Y-Y such that light is either reflected or allowed to pass through each element along the same axis.

Referring to FIG. 4, the polarization mirror 16, the QWP 17, and the second reflection mirror 18 are sequentially provided below the objective lens 11. The polarization mirror 16, the QWP 17, and the second reflection mirror 18 are located on a beam axis that passes through the objective lens 11, and they are positioned to be inclined with respect to a beam axis in a beam incident direction and a beam axis that passes through the objective lens 11. The QWP 17 and the second reflection mirror 18, which are located below the objective lens 11, are disposed approximately or substantially parallel to each other.

According to various aspects, the QWP 17 and the second reflection mirror 18 may be mutually attached to each other. According to another aspect, the second reflection mirror 18 may be provided by forming a reflective coating layer on a bottom surface of the QWP 17.

As described herein, the polarization mirror 16 reflects a first polarized beam such as a P-wave or an S-wave, and transmits a second polarized beam. Accordingly, an incident beam which contains a first polarized beam element proceeds toward the objective lens 11. Then, the incident beam is reflected by the polarization mirror 16, and then, is firstly incident on the QWP 17 which is placed below the polarization mirror 16. A path of the incident beam that is reflected by the polarization mirror 16 is substantially identical to a beam axis of the objective lens 11. As the incident beam passes through the QWP 17, the first polarized beam element may change to a circularly-polarized beam element. The incident beam which has the circularly-polarized beam element is reflected by the second reflection mirror 18 and secondly passes through the QWP 17. The circularly-polarized element of the incident beam changes to a second polarized beam. Thus, the incident beam passes through the polarization mirror 16 and proceeds to the objective lens 11.

A reflection beam, that is, a beam obtained by reflection on the medium 1, includes the second polarization element. The reflection beam passes through the polarization mirror 16, and then, firstly passes through the QWP 17. The second polarization element changes to a circularly-polarized element. The reflection beam which includes the circularly-polarization element, is reflected on the second reflection mirror 18, and then secondly passes through the QWP 17. As a result, the reflection beam includes the first polarization mirror 16 again. Finally, the reflection beam which includes the first polarization element is reflected by the polarization mirror 16, and then, proceeds to the optoelectronic system 30 via the beam splitter 13. The optoelectronic system 30 generates an electrical signal for controlling data reproducing and optical pickup by using an incident reflection beam that includes the first polarization element.

A lower spherical surface 11a of the objective lens 11 extends below an extension line X' in a direction of an incident beam. A space or height from a lower surface of the second reflection mirror 18 to an upper surface of the objective lens 11, that is, a lens height H1, is an important parameter for determining a thickness of the optical pickup device 2. For example, the lens height H1 determines a degree of reducing the height of the optical pickup device 2. Accordingly, when designing a slim-type optical pickup device, it is desirable to select and dispose an optical part that minimizes the lens height H1 as much as possible.

Therefore, the optical pickup device 2 described herein may be easily reduced in size in comparison to the conventional optical pickup device. According to various aspects, the size of the optical pickup device 2 may be reduced by using a focusing optical system with such a structure as described above. That is, an optical path along a beam axis Y-Y of the objective lens 11 is separate from an optical path along an axis X-X of an incident beam directed toward the polarization mirror 16. The two optical paths meet on a beam axis Y-Y which is formed by the polarization mirror 16 and the second reflection mirror 18 which is located below the polarization mirror 16.

In such a structure described herein, unlike the conventional optical pickup device, a path of an incident beam and a beam axis of the objective lens 11 do not cross each other. Thus, the lower spherical surface 11a of the objective lens 11 is out of a path of the incident beam, and may be adjacent to the polarization mirror 16. As a result, the lens height H1 may be reduced, which may further reduce a size of the slim-type optical pickup device.

Additionally, the polarization mirror 16, the QWP 17, and the second reflection mirror 18 are disposed on a beam axis that passes through the objective lens. In a conventional structure, because a QWP and a reflection mirror are disposed separately from an objective lens, an additional space for the QWP and the reflection mirror is required. However, according to various aspects, an additional space is not necessary. Accordingly, the optical pickup device may be further minimized.

As an example, the polarization mirror 16 may have a reflection ratio of 98% or higher with regard to the first polarized beam, and a transmission ratio of 98% or higher with regard to the second polarized beam. These ratios may be obtained by using a coating layer that is formed on a surface of a flat plate or a prism.

Figure 5:
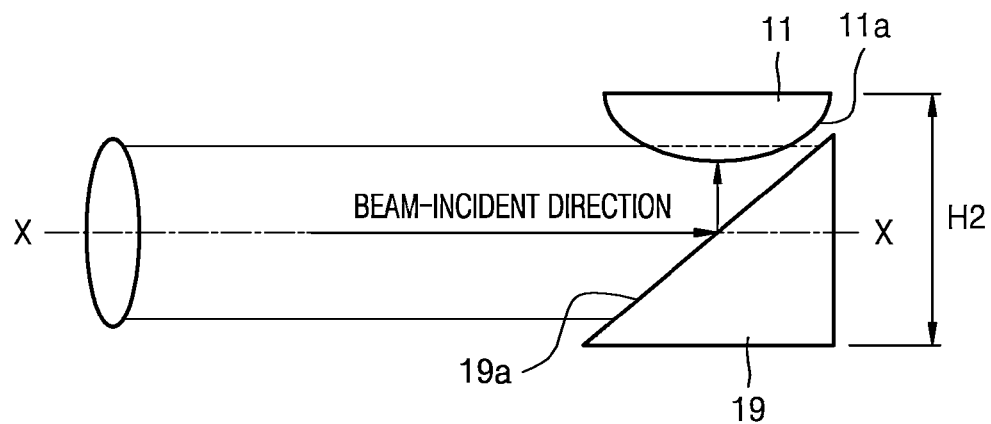
FIG. 5 is a diagram illustrating an example of a focusing optical system of another optical pickup device.

FIG. 5 illustrates an example of a structure of another focusing optical system in comparison to the focusing optical system of FIG. 4.

As illustrated in FIG. 5, a prism mirror 19 is provided below the objective lens 11. The prism mirror 19 includes a reflection layer 19a, and thus, an incident beam thereon is reflected onto the objective lens 11 which is above the prism mirror 19. The prism mirror 19 may be substituted by a plate-type mirror that includes the reflection layer 19a.

As illustrated in FIG. 5, if the objective lens 11 is placed too low, a part of an incident beam directed toward the prism mirror 19 will be obstructed by the spherical surface 11a of the objective lens 11, and thus, may not be incident on the prism mirror 19. Because of this, a part of the incident beam which is obstructed by the spherical surface 11a may not proceed to the objective lens 11, and may generate optical noise inside the optical pickup device. Accordingly, in the structure of the focusing optical system shown in FIG. 5, reducing a height H2 of the objective lens 11 is limited. As a result, it is difficult to downsize the optical pickup device.

Figure 6:
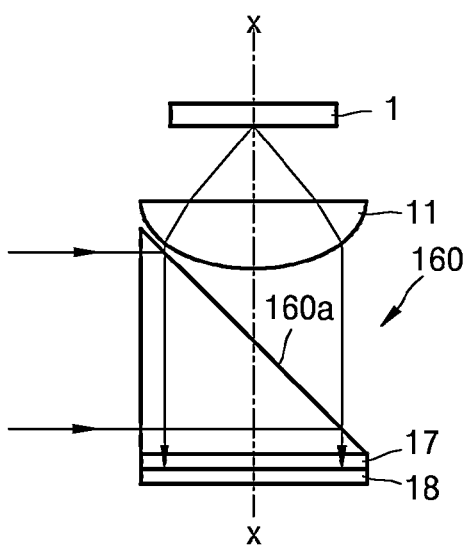
FIG. 6 is a diagram illustrating another example of a focusing optical system.

FIG. 6 illustrates another example of a focusing optical system. The focusing optical system shown in FIG. 6 includes the polarization mirror 160 of a prism type instead of a flat-plate type. The polarization mirror 160 includes a polarization reflection layer 160a which faces the objective lens 11 and reflects a first polarized beam and transmits a second polarized beam. The polarization reflection layer 160a may be a coating layer that has reflection and transmission characteristics with regard to the first polarized beam and the second polarized beam. Additionally, the QWP 17 and the second reflection mirror 18 are provided below the polarization mirror 16 on which a beam is incident. The QWP 17 and the second reflection mirror 18 may be provided as an additional part. However, according to various aspects, the QWP 17 and the second reflection mirror 18 may be formed as one body. Alternatively, the QWP 17 and the second reflection mirror 18 may be formed as one body on a lower surface of the polarization mirror 16.

Figure 7:
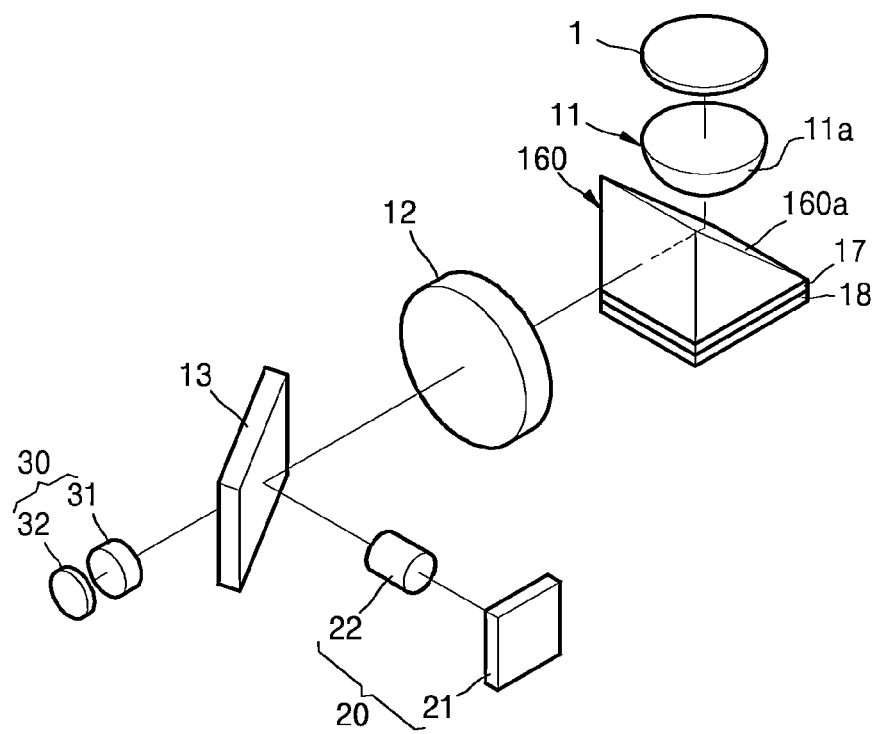
FIG. 7 is a diagram illustrating an example of a three-dimensional (3D) configuration of the optical pickup device that includes the focusing optical system of FIG. 6.

FIG. 7 illustrates another example of an optical pickup device including the focusing optical system of FIG. 6.

Referring to FIG. 7, the objective lens 11 is located below the medium 1, and the prism-type polarization mirror 160 is located below the objective lens 11. The QWP 17 and the second reflection mirror 18 are located on a lower surface of the polarization mirror 160. A collimating lens 12 and the beam splitter 13 are located in front of the polarization mirror 160, and the light-source system 20 and the optoelectronic system 30 are located at the rear of the beam splitter 13. The light-source system 20 includes the light source 21 and the diffraction device 22. The optoelectronic system 30 includes the optoelectronic device 32 and the sensing lens 31.

According to various aspects, the size of an optical pickup device may be reduced by using a focusing optical system with a slimmer structure. Instead of using a prism to reflect light towards an objective lens, a polarization mirror, a QWP, and a second reflection mirror may be disposed on a beam axis that passes through the objective lens. As a result, the height of the objective lens within a base of the optical pickup may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup device comprising:
    a light source configured to generate a beam for recording and/or reproducing information to/from a medium;
    an objective lens configured to receive the beam from the medium;
    a quarter-wave plate (QWP) disposed parallel to the objective lens such that a surface of the QWP through which the beam passes is oriented parallel to a surface of the objective lens through which the beam passes;
    a reflection mirror configured to reflect the beam onto the QWP after the beam passes through the QWP; and
    a polarization minor disposed between the objective lens and the QWP, and configured to reflect the beam generated from the light source onto the QWP, and allow the beam reflected by the reflection minor to pass to the objective lens, wherein
    the beam changes into a circularly-polarized beam element in response to passing through the QWP and changes into a straight beam in response to being reflected by the reflection mirror.

2. The optical pickup device of claim 1, wherein the beam is incident on the polarization minor along a path in a direction substantially perpendicular to a beam axis of the objective lens.

3. The optical pickup device of claim 1, wherein the objective lens comprises a spherical surface that protrudes in a direction of the polarization minor.

4. The optical pickup device of claim 1, wherein the objective lens comprises a spherical surface positioned at a height that intersects a width of the beam generated by the light source.

5. The optical pickup device of claim 1, wherein the reflection minor and the QWP are formed as one body.

6. The optical pickup device of claim 1, wherein the objective lens, the polarization minor, the QWP, and the reflection minor are each arranged along the same optical axis such that light is either reflected by or allowed to pass through each element along the same axis.

7. The optical pickup device of claim 1, wherein the beam which is incident from the light source comprises a first polarization element, and
    the beam which passes through the QWP and is incident on the polarization minor comprises a second polarization element.

8. The optical pickup device of claim 1, wherein the polarization minor comprises a plate-type mirror or a prism minor.

9. The optical pickup device of claim 1, wherein the beam is incident on the polarization minor along a path in a direction that is substantially perpendicular to a direction of travel between the polarization mirror and the QWP.

10. The optical pickup device of claim 1, wherein the polarization minor has a reflection ratio of at least 98 percent with regard to the beam incident on the polarization mirror.

11. An optical disk drive comprising:
    a light-source system that comprises a light source configured to generate a beam for recording and/or reproducing information to/from a medium;
    an objective lens configured to receive the beam from the medium;
    a quarter-wave plate (QWP) disposed parallel to the objective lens;
    a reflection mirror configured to reflect the beam onto the QWP after the beam passes through the QWP;
    a polarization mirror disposed between the objective lens and the QWP, and configured to reflect the beam generated from a light source onto the QWP, and allow the beam reflected by the reflection mirror to pass to the objective lens;
    an optoelectronic system that comprises an optoelectronic device configured to convert the beam reflected by the disk into an electrical signal;
    a mechanic system configured to allow a focusing operation and a tracking operation of the objective lens to be performed; and
    a circuit unit which is connected to the light source, the optoelectronic system, and the mechanic system, wherein
    the beam changes into a circularly-polarized beam element in response to passing though the QWP and changes into a straight beam in response to being reflected by the reflection mirror.

12. The optical disk drive of claim 11, wherein the beam is incident on the polarization minor along a path in a direction substantially perpendicular to a beam axis of the objective lens.

13. The optical disk drive of claim 11, wherein the objective lens comprises a spherical surface that protrudes in a direction of the polarization minor.

14. The optical disk drive of claim 11, wherein the objective lens comprises a spherical surface positioned at a height that intersects a width of the beam generated by the light source.

15. The optical disk drive of claim 11, wherein the reflection mirror and the QWP are formed as one body.

16. The optical disk drive of claim 11, wherein the objective lens, the polarization minor, the QWP, and the reflection mirror are each arranged along the same optical axis such that light is either reflected by or allowed to pass through each element along the same axis.

17. The optical disk drive of claim 9, wherein the beam which is incident from the light source comprises a first polarization element, and
    the light which passes through the QWP and is incident on the polarization mirror comprises a second polarization element.

18. The optical disk drive of claim 9, wherein the polarization mirror comprises a plate-type mirror or a prism minor.

\* \* \* \* \*